United States Patent
Koskela et al.

(10) Patent No.: US 7,376,625 B2
(45) Date of Patent: May 20, 2008

(54) SYSTEM AND METHOD FOR ACTIVATING INDIVIDUALIZED SOFTWARE MODULES IN A DIGITAL BROADCAST ENVIRONMENT

(75) Inventors: Antti Koskela, Turku (FI); Kyösti Koivisto, Kaarina (FI); Mauri Kangas, Paimio (FI)

(73) Assignee: Nokia Corporation, Espoo (FI)

( * ) Notice: Subject to any disclaimer, the term of this patent is extended or adjusted under 35 U.S.C. 154(b) by 937 days.

(21) Appl. No.: 10/000,645

(22) Filed: Nov. 15, 2001

(65) Prior Publication Data

US 2005/0005286 A1 Jan. 6, 2005

(51) Int. Cl.
*G06Q 99/00* (2006.01)
(52) U.S. Cl. ............... 705/57; 705/50; 705/51
(58) Field of Classification Search ......... 705/57, 705/50, 51
See application file for complete search history.

(56) References Cited

U.S. PATENT DOCUMENTS

| | | | |
|---|---|---|---|
| 5,666,293 A | 9/1997 | Metz et al. | |
| 6,105,134 A | 8/2000 | Pinder et al. | |
| 6,246,767 B1 | 6/2001 | Akins et al. | |
| 6,330,588 B1 * | 12/2001 | Freeman | 709/202 |
| 6,801,999 B1 * | 10/2004 | Venkatesan et al. | 713/167 |
| 6,898,706 B1 * | 5/2005 | Venkatesan et al. | 713/167 |
| 6,956,950 B2 * | 10/2005 | Kausik | 380/277 |
| 2001/0008012 A1 * | 7/2001 | Kausik | 713/156 |
| 2005/0005286 A1 * | 1/2005 | Koskela et al. | 725/31 |

FOREIGN PATENT DOCUMENTS

| | | |
|---|---|---|
| EP | 1089488 | 4/2001 |
| EP | 1128598 | 8/2001 |
| JP | 2005310182 A * | 11/2005 |
| WO | WO 0004717 | 1/2000 |

OTHER PUBLICATIONS

European Telecommunications Standards Institute, EN 301 192 v1.2.1 DVB specification for data broadcasting, 1999.
ISO, N0801 Generic Coding of Moving Pictures and Associated Audio: Systems, Nov. 13, 1994.

* cited by examiner

*Primary Examiner*—Pierre Eddy Elisca
(74) *Attorney, Agent, or Firm*—Morgan & Finnegan, L.L.P.

(57) ABSTRACT

A system and method is disclosed for enabling individualized software functions in a device. In accordance with one embodiment of the present invention software is distributed as omnibus installations containing various software modules that are initially turned off. The user gains access to the turned off modules by requesting a certificate from a system provider. The system provider creates and transmits a certificate containing the information required to enable the desired module. The device can then use the certificate to access the desired software.

36 Claims, 3 Drawing Sheets

SYSTEM AND METHOD FOR ACTIVATING INDIVIDUALIZED SOFTWARE MODULES IN A DIGITAL BROADCAST ENVIRONMENT

BACKGROUND OF THE INVENTION

With the advent of digital video broadcasting (DVB) many new services and/or capabilities are becoming available, and will continue to become available, to DVB users. Naturally, most of these new features will be provided via software modules running on the user's DVB receiver. However, due to variations in hardware, the number of possible modules, the numerous possible combinations of installed modules, and intermittent upgrades, the number of possible software combinations that could run on an individual receiver are limitless. While this limitless variety is desired and anticipated by DVB user's, because it allows them to have enhanced services individually tailored. It has the potential to cause increased costs, reduced reliability, and increased maintenance difficulties, because the growing variety will create increased system management complexity.

Ensuring that users' DVB systems operate easily and reliably is of special concern to party responsible for the DVB system, e.g. cable companies, because they are ultimately responsible for the condition of the user's equipment and the whole of the DVB system. This, for example, is in contrast to personal computers where individual users are responsible for the maintenance and operation of their systems. Accordingly, a cost effective, reliable, and easily maintained system for providing users with the varied and personalized services they desire is needed.

SUMMARY OF THE INVENTION

The above identified problems are solved and a technical advance is achieved in the art by providing a system and method for activating individualized software modules in a digital broadcast environment.

The present invention enables the desired versatility but retains ease of maintenance and management by distributing software as omnibus installations. These omnibus installations contain the requisite software to enable all of the DVB system's various services and capabilities in one unitary package. Distributing the software in this way greatly reduces the number disparate software installations. Similarly, upgrades can also be greatly simplified because they can also be distributed as omnibus packages, rather than on a module by module basis. This system of unitary software packages greatly increases system maintenance efficiency.

Although an individual user's receiver contains software to enable the full scope of the DVB receiver's capabilities and services, the software to enable these functions will initially be turned off and inaccessible to the user. To gain access to particular individualized features the user must request access from the system provider. This would generally be done by contacting a human representative of the system provider or through an automated process. The system provider can then issue a certificate to enable the precise modules requested by the user.

An exemplary method in accordance with the present invention includes, requesting personalized features from the user's DVB system provider. Receiving a certificate from the system provider. Decrypting any encrypted portions of the certificate. Using information contained in the certificate to enable software that performs the requested personalized features. And, using the enabled software.

Another embodiment of the present invention, receiving a request for enhanced service features and a receiver ID at a system provider. Creating a certificate to satisfy the feature request. Obtaining a stored key associated with the receiver ID. Using the key to encrypt part of the certificate. Sending the certificate to the receiver indicated by the ID.

Other and further aspects of the invention will become apparent during the course of the following description and by reference to the attached drawings.

DETAILED DESCRIPTION OF THE INVENTION

The software maintenance system of the present invention provides flexibility for individual users while maintaining reliability and ease of administration for system providers. The present invention operates to reduce the number of variant software versions and installations by distributing software as omnibus installations and updates. These omnibus updates include numerous different software modules that enable various services and capabilities in the recipient DVB receivers. The modules are turned off by default. To enable a given feature provided by a module the user would obtain a certificate from the system provider.

Figure 1:
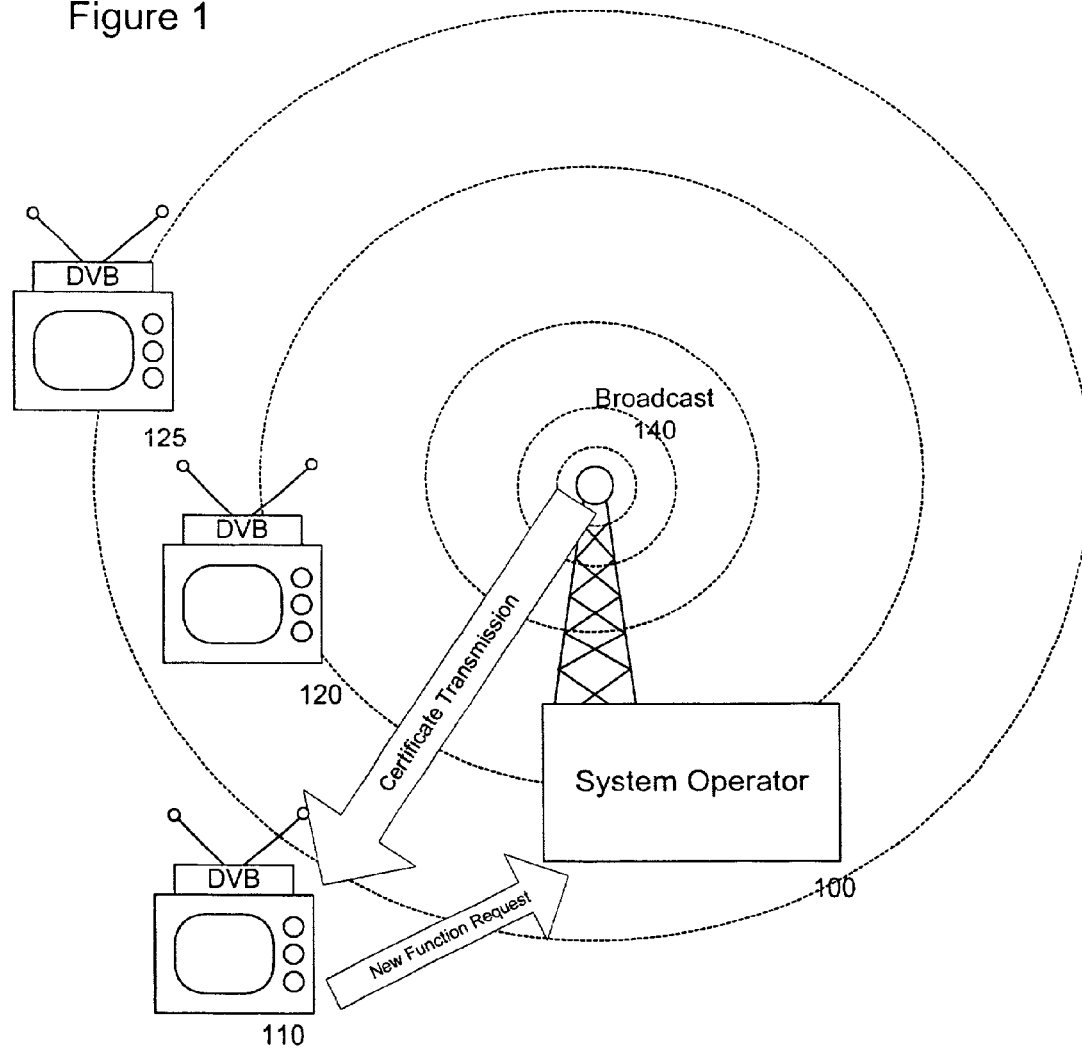
FIG. 1 depicts an exemplary embodiment of the present invention.

FIG. 1 is a block diagram illustrating an exemplary embodiment of the present invention. DVB receivers, such as 110, 120 and 125, receive broadcasts from system provider 100 via broadcast tower 140. FIG. 1 depicts these broadcasts as over-air transmissions, however, the broadcasts can be delivered via any known or later developed method. Additional examples of current methods are cable and satellite. These are embodied in different DVB protocols, such as, DVB-T, DVB-C and DVB-S.

Generally, DVB receivers contain elements very similar to a general purpose computer, such as a CPU, RAM, flash memory, long term storage and a data bus. The DVB receivers contain software that controls their operation. In the present invention omnibus software will be installed containing both the standard software and software modules to enable enhanced functions. Initially this software is pre-installed on the receiver, but it can be updated or changed later via software downloads from the system provider. These software downloads are delivered to the receivers via broadcast or any other means. For example, the software could be updated via the internet or the updated software could be mailed to the user on a disk.

An overview of the process for obtaining a certificate is depicted in FIG. 1. The process begins when a user decides on a desired service beyond those enabled by the receiver's base software installation. The user of receiver 110 sends a request for the new function to the system provider 100. This request can be sent using any known method of communication including, but not limited to, postal mail, phone, e-mail, the world wide web, or 2-way cable. Obviously, the request can be transmitted directly from the receiver, or can involve transmission via a separate device depending on the method used. The system provider fulfills the request by creating a certificate to enable the requested function. This certificate is then sent back and installed in the user's receiver. In one advantageous embodiment the certificate is sent directly to the receiver within the DVB transport stream, for example by using the Multiprotocol Encapsulation method. This protocol is described in European Telecommunications Standards Institute (ETSI) document DVB Specification for Data Broadcasting, EN 301 192 v1.2.1 (1999). The certificate, however, can be sent using any know method, such as the ones described for transmitting the request.

A certificate contains information to enable particular software functions in the receiver. In one advantageous embodiment this information is simply a coded bit-pattern that acts to identify which of the software modules in the receiver should be turned on. The certificate, however, could contain additional information, such as the parameters for the enabled features or an identification code for a particular receiver. Moreover, the certificate will generally be protected to ensure only legitimate, e.g. paying, users can obtain the requested features.

Generally, the certificate will be protected via encryption. One efficient method to accomplish encryption in the present invention is to install secret keys in the DVB receivers and provide a matching secure database of encryption keys to the system provider. In this way the receiver and system provider can communicate securely. Any know symmetric encryption algorithm could be employed, such as AES, DES, 3-DES, IDEA, etc. To achieve additional security the certificate could further include an initialization vector to be used in the encryption algorithm.

Additional certificate security can be accomplished by providing a hash value to authenticate the certificate. For example, a secret hash string can be stored in the receivers and at the system provider. This secret hash string can be appended to, but should not be sent with, the certificate. A hash function can be applied to the combination of the certificate and hash string. The result of this hash function would be included in the certificate, thereby allowing the receiver to perform the same operation and compare the resulting values. If the values are identical the receiver can be assured of the certificate's authenticity.

The receiver's secret key and hash string should be stored securely in the receiver. This information can be stored in numerous places in the device, for example, on a specialized chip, on a smart card, in the boot sector of the hard drive, or in flash memory. Generally, the level of security desired by the system provider will aid in the determination of which location is used.

The receivers will also need a receiver identification code (RIDC) to individually identify each receiver in the DVB system. The RIDC is sent to the system provider along with any request for additional functions. The RIDC allows the system provider to identify the appropriate key to encrypt the certificate and the appropriate recipient of the certificate. The RIDC can be generated in a number of different ways. For example, the RIDC can simply be the receiver's serial number.

More secure methods of RIDC generation may be required to prevent malicious users from duplicating a receiver's ID. There are many different sources from which to generate this more secure RIDC. These include a user personal identification number (PIN), flash memory, the boot sector of a hard drive, codes attached to hardware chips in the receiver, a secure processor, or a smart card. Each of these, or a combination of any of these, can be used to generate the RIDC.

Another method for securing the RIDC would be to encrypt the code generated by any of the previously described methods. This would be accomplished by using a global key to encrypt the RIDC prior to transmission. This global key would be used throughout the DVB system for this purpose. Upon receipt the system provider would use its copy of the global key to decrypt the RIDC.

Figure 2:
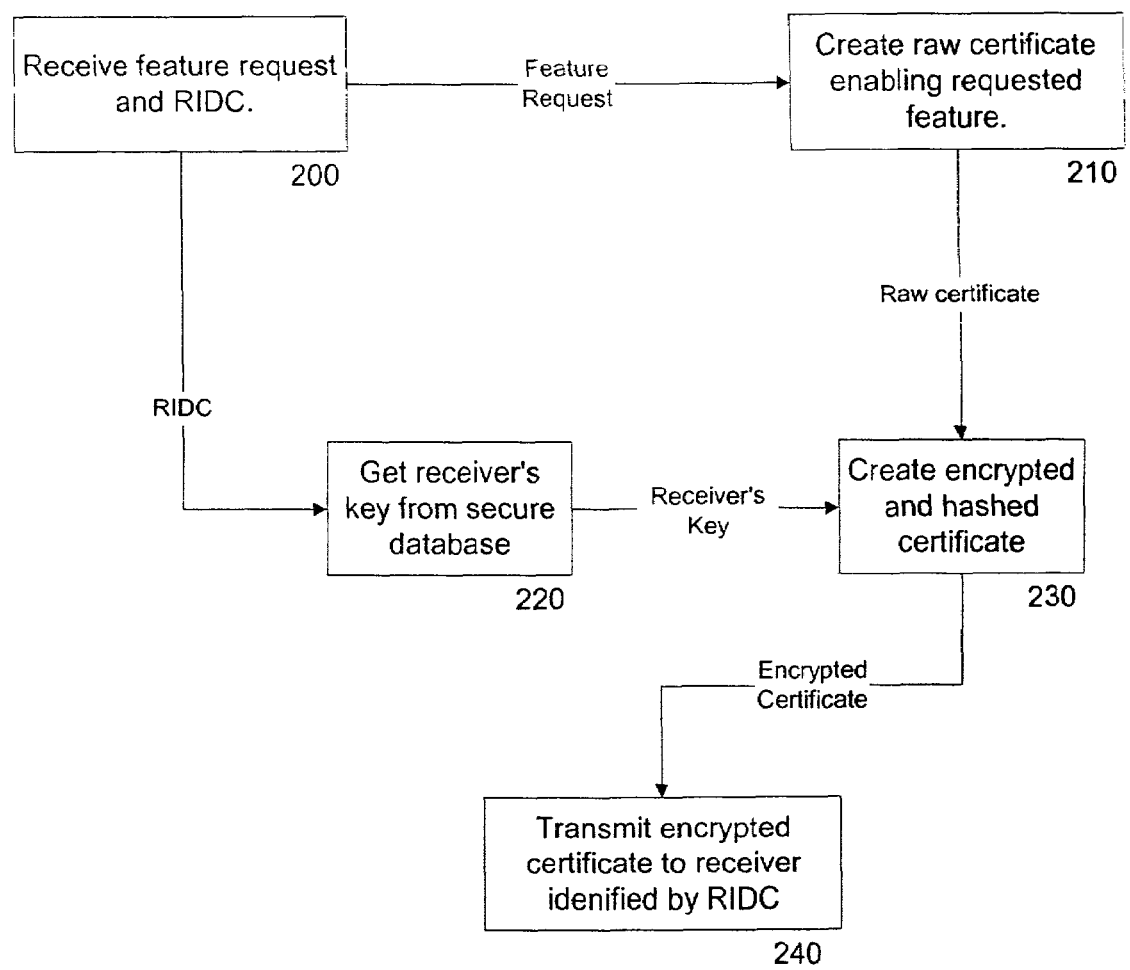
FIG. 2 depicts a flow diagram illustrating an exemplary process by which a certificate request is processed.

FIG. 2 depicts an exemplary method used by the system provider to generate a certificate. The outlined process will generally be preformed by a computer with a CPU, RAM, long term storage, a data bus, etc. In an advantageous embodiment the computer is connected to a network that allows it to insert the resulting certificate into the DVB broadcast stream.

As shown in block 200, the process of certificate creation begins with the receipt of feature request from a particular RIDC. This request can be received via any of the transmission methods described above. The request can come directly from the receiver via the internet or another two-way system, in a machine—machine communication. Or, if received via phone or mail it can be entered into the computer by an employee of the system provider.

Two steps follow the initial receipt of the request. As shown in block 210, a raw voucher is created containing the code necessary to enable the requested feature. Other elements, such as parameters for the new feature, can also be added at this time. As shown ill block 220, the RIDC is used to retrieve a copy of the requesting receiver's secret key from the secure database. Other receiver specific information can also be gathered at this time. For example, if receiver specific hash strings are used that information would also be collected.

As shown in block 230, the receiver's key and the raw certificate information are used to create the final encrypted and hashed certificate. At least a part of the certificate will be encrypted to protect the information that enables the requested function. Alternatively, the entire certificate can be encrypted. If an initialization vector is being used to perform the encryption, it should also be added to the certificate, at this time.

The hash function is also applied to the certificate to create a hash value for authentication purposes. The hash function is applied to the certificate and a secret hash string. This hash string is either a global secret shared throughout the provider's system, or it can be a piece of information specific to the individual requesting receiver.

Finally, as shown in block 240, the final encrypted certificate is transmitted to the requesting receiver. This can be accomplished by sending the user a code that must be entered into the receiver via its user interface, or by sending it directly over a network to the receiver. An advantageous means of accomplishing the transfer is to put the certificate into the DVB transport stream.

Figure 3:
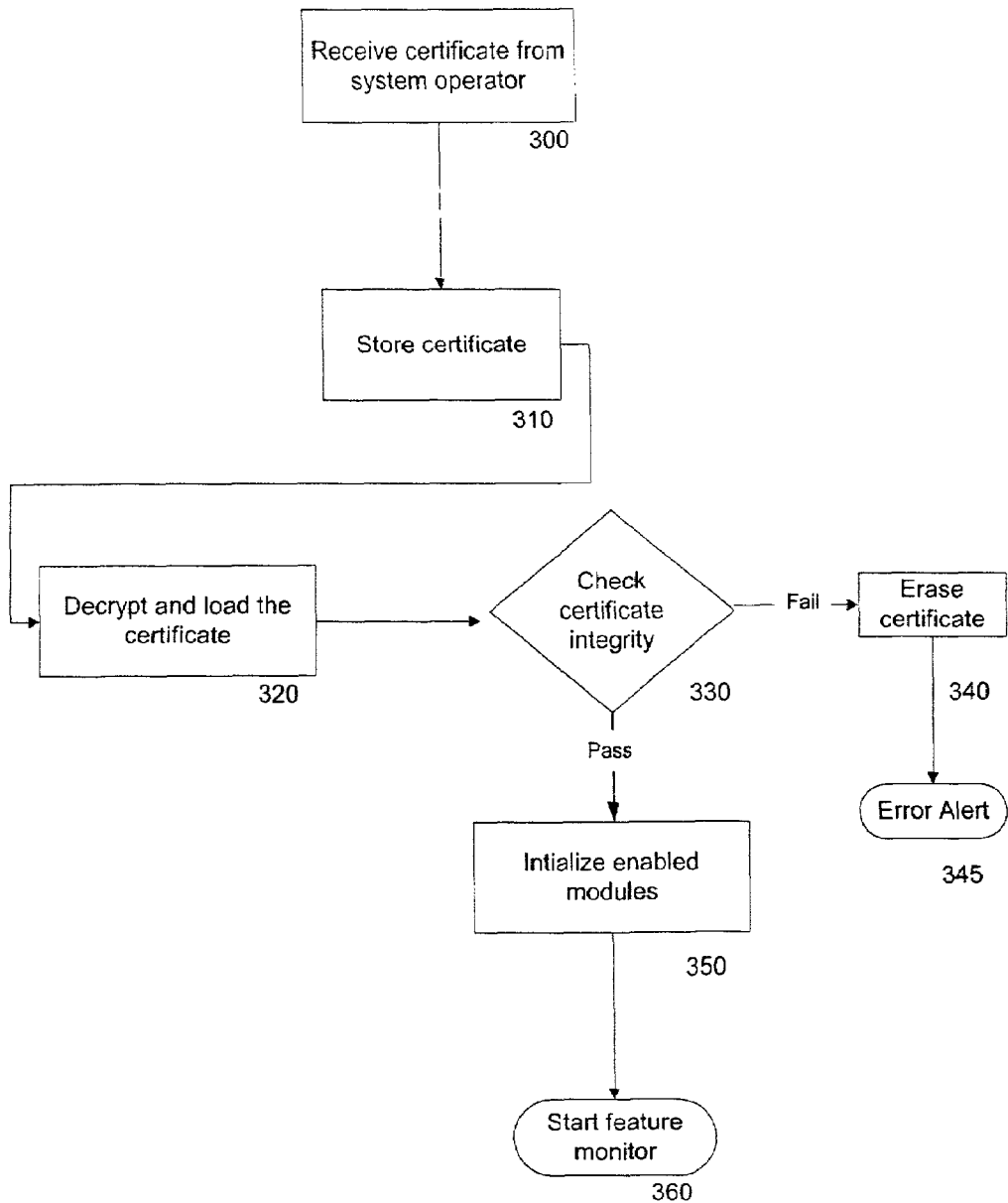
FIG. 3 depicts a flow diagram illustrating an exemplary process used by a I)VB receiver to enable the functions granted by a certificate.

FIG. 3 depicts an exemplary method used by the DVB receiver to enable the functions granted by certificates. As shown in block 300, the process begins with the receipt of the certificate from the system provider. The certificate can arrive via any of the means discussed above. If the certificate arrives via a method that requires the user's involvement, such as over the phone, the user must perform the step of installing the certificate. This could be accomplished by having user interface elements in the receiver that allowed the user to type in a code embodying the certificate. Another alternative, would be to distribute the certificates on smart cards that are inserted into the receiver. If the certificate was delivered directly to the receiver electronically, the receiver would employ software to accept the certificate.

However the certificate arrives, it must be stored at the receiver, as shown in block 310. The certificate can be stored on flash memory, hard disk, smart card, or some other rewritable long term storage medium.

Blocks 300 and 310 indicate actions that are taken when a new certificate is acquired and would only execute in those instances. The remainder of FIG. 3 presents actions, that run every time the DVB receiver is started.

As shown in block 320, the DVB receiver decrypts the certificate stored in the receiver and loads it into RAM. An alternative design could employ separate certificates for each function. The present description is directed to one certificate containing all the available functions, because it is simpler to describe.

As shown in block 330, the integrity of the certificate is checked. This step would include checking the hash value of the certificate along with checksum and range checks. If the integrity check is failed, thus indicated a defective certificate or possible tampering, the certificate is erased, as shown in block 340. After the certificate is erased an error alert can be displayed, as shown in block 345. This error can range from simply alerting the user that the certificate check failed and that a new certificate must be procured to use the additional features, to disabling the receiver entirely thereby requiring intervention of the system provider to reinitialize the receiver. The choice among these and other possible reactions to the check failure is simply a business decision regarding a balance between security and convenience.

As shown in block 350, if the integrity check is passed the software modules enabled by the certificate are initialized. The software modules used to create the features enabled by the certificate are already contained in the receiver, but are turned off. These modules must be activated and accessed to perform the desired functions. In an exemplary embodiment of the present invention, this access is accomplished via a locked module interface. The locked module interface represents a system software functional unit that controls access to the controlled modules. Directing all access to the optional software modules through one place allows increased security and design efficiency. The locked module interface will be sent the coded bit pattern contained in the certificate and then enable the software modules the bit pattern indicates as active.

With the locked module interface initialized with the coded bit pattern, the final step is to start the feature monitor, as shown in block 360. The feature monitor is simply represents the idea that the system waits for function calls that require the use of the locked software. Such a call might occur when the user of the DVB receiver uses the receiver's interface to initiate one of the protected features. The feature monitor would react to that request passing it along to the lock module interface. The locked module interface would then check to see if the requested function is enabled. This check could be as simple as checking if a particular flag is set. If the check is passed the software code enabling the requested function is executed.

Further aspects of the present invention will be explored through the presentation of an example of the complete operation of the present invention.

This example presents the operation of the present invention in an embodiment where the DVB receiver cannot directly communicate with the system provider's computers. A user has a DVB receiver connected to a display to receive DVB content. The DVB receiver receives this content via a broadcast medium, such as over-air transmission. The DVB receiver, however, does not have the means to transmit communications of its own back to the system provider.

The user interacts with the DVB receiver via a user interface and an input device. The user interface employs software running on the DVB receiver that presents information on the display. The input device is a simple alphanumeric remote control.

The DVB receiver also contains inactive software modules that enable optional services available to the user. The user interface contains a means to access a list of these functions. If a user wishes to access one of these optional functions she can use the input device to select the desired option, thereby beginning the process of certificate procurement.

The DVB receiver must then begin the process of generating a display code that can be sent to the system provider. First, the receiver's identification code (RIDC) is retrieved. Parts of the RIDC can be stored on a number of different devices in the receiver. Part of the code is stored in the boot section of a hard drive, another part is tied to a specific chip in the device, such as a processor ID, and the final part is stored on a smart card. The receiver's system software will collect this information in a predetermined manner and present it to the user via the display, as a display code. Information identifying the requested feature might also be included in this code.

The user must then provide this code and the feature request to the system provider. This can be accomplished using almost any communication means. Here, the user calls the system provider and gives a telephone operator the display code. The operator can then enter the information into the provider?s computers. Generally, this step would also include the user being billed for the additional service.

The system provider then must provide the user a certificate to enable the requested feature. The display code is used to identify the user and her DVB receiver. The system provider's computer uses this information to look up information about user's receiver. This information includes what is software running on the user's receiver, the receiver's secret key and secret hash string stored in the receiver.

The next step in certificate generation is to gather the information required to enable the software that accomplishes the requested feature into a raw certificate. This information includes a coded bit pattern that unlocks the requested function. This bit pattern also unlocks any other individualized features the user currently uses. The information in the raw certificate also includes parameters related to the requested function and certificate formatting information, like headers etc.

The raw certificate is then processed. First, the coded bit pattern is encrypted using the copy of the receiver's private key stored. Next, the receiver's private hash string is appended to the raw certificate and a SHA digital hash function is calculated over the certificate and the hash string. The result of this calculation is a hash value. The private hash string is removed from the certificate, and the hash value is added to the certificate. The certificate is now finalized. At this point the certificate is secure for transmission back to the user because, due to the encryption, it can only be used by the individual user's receiver.

All of the preceding steps, directed to certificate generation, are accomplished while the user is still on the phone with the operator. With the process complete, the operator provides the user with a string of alpha numeric characters embodying the certificate.

The user then uses the DVB receiver's user interface to enter this string of characters into the receiver. The receiver must then perform a security check on the certificate. First, the receiver retrieves its private hash string from a secure memory. It appends it to the certificate, minus the hash value, and performs the same hash calculation preformed by the provider's computer. It then compares its result to the hash value included in the certificate. If the values match the receiver can be assured of the certificates authenticity. If it fails, an error results. Next, the receiver stores the certificate in a secure flash memory. The certificate overwrites any previously stored certificates, because, as described above, it contains a bit pattern that enables all of the user's individualized functions.

To use the certificate the receiver would decrypt the coded bit pattern using its private key. It can then use this information, and any parameters stored in the certificate, to turn on the desired software modules. The module would be accessed via system software that maintains the integrity of the specialized software modules. Any software call to a specialized module would first go to system software and a check would be performed to ensure the installed certificate allows the requested use.

Obviously, the previous example can be altered to include other elements of the present invention. For example, if a two-way system were employed the DVB receiver could communicate directly with the system provider's computer, thereby avoiding the process of calling the operator to make the request. Similarly, the certificate could be delivered in the DVB broadcast stream directly to the user's receiver, thereby avoiding the need for the user to enter the alphanumeric character string. This delivery method would also allow more information to be provided in the certificate, because large certificates would necessitate large character strings and thereby become tedious to enter by hand.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact instruction and operation illustrated and described herein. Accordingly, all suitable modifications and equivalents that may be resorted to are intended to fall within the scope of the claims.

The invention claimed is:

1. A method for providing selective use of locked software modules on a receiver comprising:
   decrypting an encrypted certificate stored on a storage medium;
   using part of the decrypted certificate to initialize the locked software modules indicated by the certificate, including setting a code enabled flag corresponding to the enabled modules;
   receiving a request for the use of a specific locked software module;
   checking the code enabled flag corresponding to the specific locked software module to see if can be used;
   if the flag indicates use is allowed, using the specific locked software module; and
   checking the integrity of the certificate, wherein checking the certificate integrity comprises:
   applying a hash function to at least a portion of the certificate and a hash string; and
   comparing the result to a hash result stored in the certificate.

2. The method of claim 1 further comprising:
   disabling the receiver if the integrity check fails.

3. A method for obtaining enhanced software capabilities comprising:
   transmitting a features request and a receiver ID from a first device to a system provider;
   the system provider:
   receiving the features request and the receiver ID at the system provider;
   generating a certificate to enable the requested features;
   retrieving a secret key associated with the receiver ID;
   encrypting at least part of the certificate using the secret key;
   transmitting the encrypted certificate;
   applying a hash function to at least a portion of the certificate and a hash string; and
   incorporating the result in to the certificate;
   receiving the encrypted certificate at the first device;
   decrypting the encrypted certificate using a secret key stored at the first device;
   applying the hash function to the same portion of the certificate and a locally stored copy of the hash string; and
   comparing its result to the result stored in the certificate.

4. The method of claim 3 wherein the features request is transmitted from the first device via a two-way system.

5. The method of claim 3 wherein the encrypted certificate is transmitted as part of a DVB transport stream.

6. A method for enhancing software capabilities on a receiver comprising:
   receiving a features request and a receiver ID;
   generating a certificate to enable the requested features;
   retrieving a key associated with the receiver ID;
   encrypting at least part of the certificate using the key; and
   transmitting the encrypted certificate;
   wherein the receiver decrypts the encrypted certificate:
   wherein the receiver uses part of the decrypted certificate to initialize any locked software modules indicated by the certificate, including setting a code enabled flag corresponding to the enabled modules;
   wherein the receiver receives a request for the use of a specific locked software module;
   wherein the receiver checks the code enabled flag corresponding to the specific locked software capability to see if can be used; and
   wherein, if the flag indicates use is allowed, the receiver uses the specific locked software capability.

7. A method for obtaining enhanced software capabilities comprising:
   transmitting a features request and a receiver ID from a first device to a system provider;
   receiving an encrypted certificate at the first device;
   decrypting the encrypted certificate using a secret key stored at the first device;
   using part of the decrypted certificate to initialize any locked software modules indicated by the certificate, including setting a code enabled flag corresponding to the enabled modules;
   receiving a request for the use of a specific locked software module;
   checking the code enabled flag corresponding to the specific locked software capability to see if can be used; and
   if the flag indicates use is allowed, using the specific locked software capability.

8. The method of claim 7 further comprising:
checking the integrity of the certificate.

9. The method of claim 8 wherein the step of checking certificate integrity comprises:
applying a hash function to at least a portion of the certificate and a hash string;
comparing the result to a hash result stored in the certificate.

10. The method of claim 9 further comprising:
disabling the receiver if the integrity check fails.

11. The method of claim 8 wherein the features request is transmitted from the first device via a two-way system.

12. The method of claim 8 wherein the encrypted certificate is received as part of a DVB transport stream.

13. The method of claim 8 wherein the features request is transmitted from the first device via a two-way system.

14. The method of claim 8 wherein the encrypted certificate is received as part of a DVB transport stream.

15. An apparatus capable of providing individualized software functions comprising:
means for interfacing with a user;
means for generating a receiver identification code;
means for transmitting a new function request, including the receiver identification code;
means for receiving a certificate;
means for decrypting the certificate;
means for using part of the decrypted certificate to initialize any locked software modules indicated by the certificate, including setting a code enabled flag corresponding to the enabled modules;
means for receiving a request for the use of a specific locked software module;
means for checking the code enabled flaa corresponding to the specific locked software capability to see if can be used; and
means for using, if the flag indicates use is allowed, the specific locked software capability.

16. The apparatus of claim 15 further comprising:
means for encrypting the receiver identification code.

17. The apparatus of claim 15 further comprising:
means for authenticating the certificate.

18. An apparatus capable of providing individualized software functions comprising:
means for interfacing with a user;
means for generating a receiver identification code;
means for encrypting the receiver identification code;
means for transmitting a new function request, including the receiver identification code;
means for receiving a certificate;
means for authenticating the certificate;
means for decrypting the certificate;
means for using part of the decrypted certificate to initialize any locked software modules indicated by the certificate, including setting a code enabled flag corresponding to the enabled modules;
means for receiving a request for the use of a specific locked software module;
means for checking the code enabled flag corresponding to the specific locked software capability to see if can be used; and
means for using, if the flag indicates use is allowed, the specific locked software capability.

19. An apparatus, comprising:
a memory having program code stored therein; and
a processor disposed in communication with the memory for carrying out instructions in accordance with the stored program code;
wherein the program code, when executed by the processor, causes the processor to perform:
decrypting an encrypted certificate stored on a storage medium;
using part of the decrypted certificate to initialize the locked software modules indicated by the certificate, including setting a code enabled flag corresponding to the enabled modules;
receiving a request for the use of a specific locked software module;
checking the code enabled flag corresponding to the specific locked software module to see if can be used;
if the flag indicates use is allowed, using the specific locked software module; and
checking the integrity of the certificate, wherein checking the certificate integrity comprises:
applying a hash function to at least a portion of the certificate and a hash string; and
comparing the result to a hash result stored in the certificate.

20. The apparatus of claim 19 wherein the processor further performs:
disabling the apparatus if the integrity check fails.

21. The apparatus of claim 19, further comprising:
a network interface disposed in communication with the processor,
wherein the apparatus is a receiver.

22. An apparatus, comprising:
a memory having program code stored therein; and
a processor disposed in communication with the memory for carrying out instructions in accordance with the stored program code;
wherein the program code, when executed by the processor, causes the processor to perform:
receiving a features request and a receiver ID;
generating a certificate to enable the requested features;
retrieving a key associated with the receiver ID;
encrypting at least part of the certificate using the key; and
transmitting the encrypted certificate,
wherein the receiver decrypts the encrypted certificate,
wherein the receiver uses Dart of the decrypted certificate to initialize any locked software modules indicated by the certificate, including setting a code enabled flag corresponding to the enabled modules;
wherein the receiver receives a recquest for the use of a specific locked software module;
wherein the receiver checks the code enabled flag corresponding to the specific locked software capability to see if can be used; and
wherein, if the flag indicates use is allowed, the receiver uses the specific locked software capability.

23. An apparatus, comprising:
a memory having program code stored therein; and
a processor disposed in communication with the memory for carrying out instructions in accordance with the stored program code;
wherein the program code, when executed by the processor, causes the processor to perform:
transmitting a features request and a receiver ID from the apparatus to a system provider;

receiving an encrypted certificate at the apparatus;
decrypting the encrypted certificate using a secret key stored at the apparatus;
using part of the decrypted certificate to initialize any locked software modules indicated by the certificate, including setting a code enabled flag corresponding to the enabled modules;
receiving a request for the use of a specific locked software module;
checking the code enabled flag corresponding to the specific locked software capability to see if can be used; and
if the flag indicates use is allowed, using the specific locked software capability.

24. The apparatus of claim 23 wherein the processor further performs:
checking the integrity of the certificate.

25. The apparatus of claim 24 wherein checking certificate integrity comprises:
applying a hash function to at least a portion of the certificate and a hash string; and
comparing the result to a hash result stored in the certificate.

26. The apparatus of claim 25, wherein the processor further performs:
disabling the apparatus if the integrity check fails.

27. The apparatus of claim 23 wherein the features request is transmitted from the apparatus via a two-way system.

28. The apparatus of claim 23 wherein the encrypted certificate is received as part of a DVB transport stream.

29. The apparatus of claim 23 wherein the features request is transmitted from the apparatus via a two-way system.

30. The apparatus of claim 23 wherein the encrypted certificate is received as part of a DVB transport stream.

31. The apparatus of claim 23, further comprising:
a network interface disposed in communication with the processor,
wherein the apparatus is a receiver.

32. A system, comprising:
a device disposed in communication with a system provider,
wherein the system provider is configured to:
receive a features request and a receiver ID;
generate a certificate to enable the requested features;
retrieve a secret key associated with the receiver ID;
encrypt at least part of the certificate using the secret key; and
transmit the encrypted certificate;
apply a hash function to at least a portion of the certificate and a hash string; and
incorporate the result in to the certificate; and
wherein the device is configured to:
transmit the features request and the receiver ID to the system provider;
receive the encrypted certificate;
decrypt the encrypted certificate using a stored secret key;
apply the hash function to the same portion of the certificate and a locally stored copy of the hash string; and
compare its result to the result stored in the certificate.

33. The system of claim 32 wherein the features request is transmitted from the device via a two-way system.

34. The system of claim 32 wherein the encrypted certificate is transmitted as part of a DVB transport stream.

35. An article of manufacture comprising a computer readable medium containing program code that when executed causes an apparatus to perform:
decrypting an encrypted certificate stored on a storage medium;
using part of the decrypted certificate to initialize the locked software modules indicated by the certificate, including setting a code enabled flag corresponding to the enabled modules;
receiving a request for the use of a specific locked software module; checking the code enabled flag corresponding to the specific locked software module to see if can be used;
if the flag indicates use is allowed, using the specific locked software module and checking the integrity of the certificate, wherein checking the certificate integrity comprises:
applying a hash function to at least a portion of the certificate and a hash string; and
comparing the result to a hash result stored in the certificate.

36. An article of manufacture comprising a computer readable medium containing program code that when executed causes an apparatus to perform:
transmitting a features request and a receiver ID from the apparatus to a system provider;
receiving an encrypted certificate at the apparatus;
decrypting the encrypted certificate using a secret key stored at the apparatus;
using part of the decrypted certificate to initialize any locked software modules indicated by the certificate, including setting a code enabled flag corresponding to the enabled modules;
receiving a request for the use of a specific locked software module;
checking the code enabled flag corresponding to the specific locked software capability to see if can be used; and
if the flag indicates use is allowed, using the specific locked software capability.

* * * * *